UNITED STATES PATENT OFFICE.

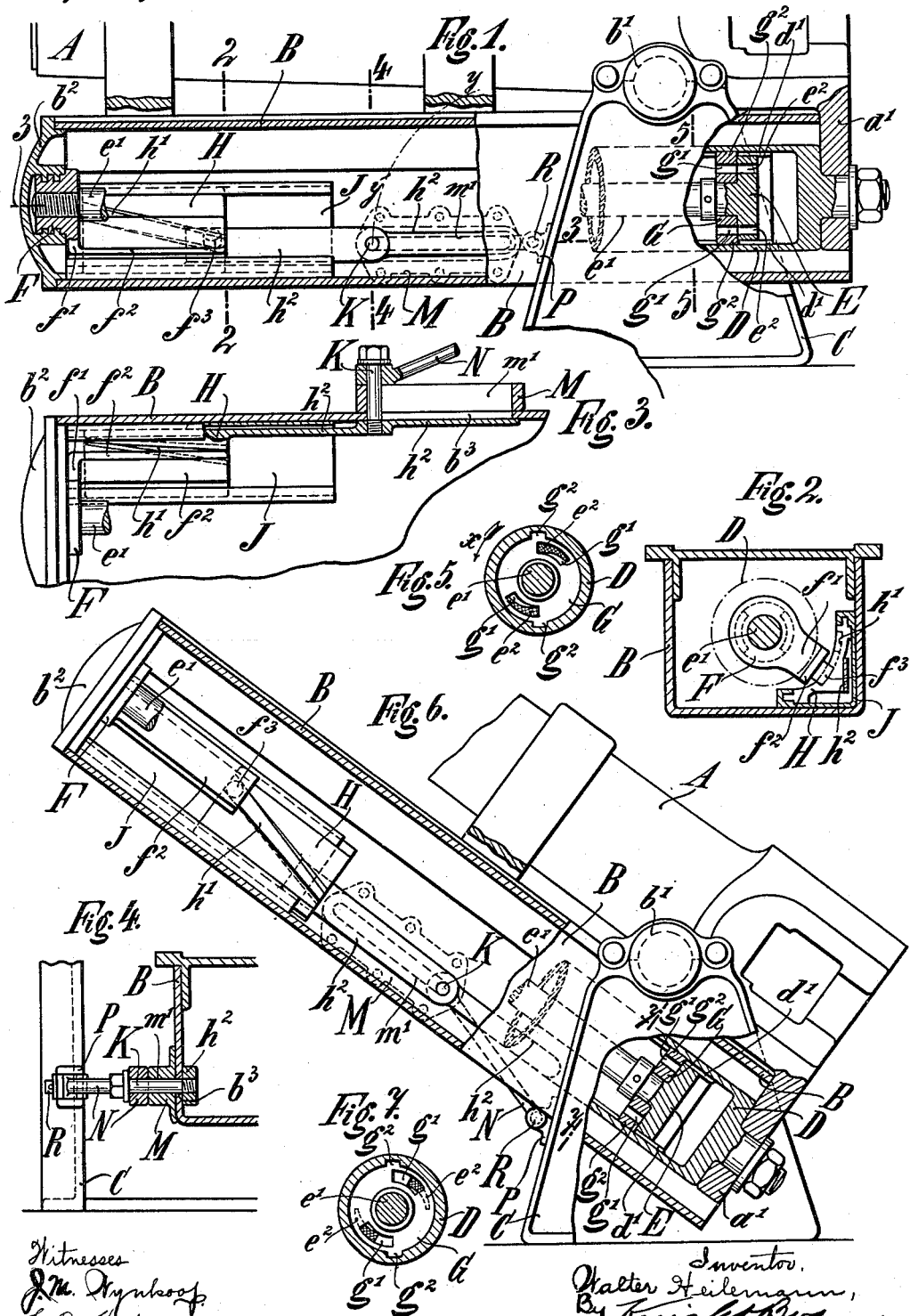

WALTER HEILEMANN, OF ESSEN-ON-THE-RUHR, GERMANY, ASSIGNOR TO FRIED. KRUPP AKTIENGESELLSCHAFT, OF ESSEN-ON-THE-RUHR, GERMANY.

FLUID-BRAKE FOR RECOIL-GUNS.

1,028,939. Specification of Letters Patent. Patented June 11, 1912.

Application filed September 20, 1910. Serial No. 582,914.

*To all whom it may concern:*

Be it known that I, WALTER HEILEMANN, a subject of the Emperor of Germany, and a resident of Essen-on-the-Ruhr, Germany, have invented certain new and useful Improvements in Fluid-Brakes for Recoil-Guns, of which the following is a specification.

The present invention relates to recoil guns with fluid recoil brake, part of which brake is rotated automatically by elevating the gun in order to regulate the recoiling length; and it aims in particular at the improvement of the gearing for such rotation of the brake-parts of this kind of mount. This object is, according to the present invention, gained thereby that the turnable part of the brake, through a guiding groove, has a restricted connection with a slide running lengthwise on guides.

The accompanying drawing shows in Figure 1, a view partly in section and partly in side elevation of the gun parts necessary to the carrying out the object of the invention. Fig. 2 is a section on the line 2—2 of Fig. 1 as seen from the right. Fig. 3 is a plan view partly in section, on the line 3—3 of Fig. 1, of certain details. Fig. 4 is a section taken on the line 4—4 of Fig. 1 as seen from the left. Fig. 5 is a section on the line 5—5 of Fig. 1 also seen from the left, Fig. 6 is a similar view to Fig. 1 showing the gun in elevation and; Fig. 7 is a section of Fig. 6 on line 7—7 seen from the left.

The gun A (Figs. 1 and 6) is mounted in the cradle B so that it can slide in it, and rock with it around the axis of the trunnions $b^1$ (of which only the left one is shown) in the bearings of the top gun carriage C (Figs. 1, 4 and 6). Between the top carriage C and the cradle B, the usual elevating gear is mounted (not in the drawing). The recoil brake cylinder D is at its rear end rigidly connected to the horn $a^1$.

The rod $e^1$ of the recoil-piston E carries a muff F screwed thereon at its forward end, and which by means of a bayonet lock, is connected with the cap $b^2$ of the cradle B, so that the rod may turn but not shift lengthwise. The recoil cylinder, being broken off on the drawing almost entirely, reaches with the gun in firing position, nearly out to the muff F. A revolving sleeve G which may turn but not shift lengthwise is mounted on the piston rod $e^1$, and has orifices $g^1$ for the passing of the braking fluid. Said part G lies immediately against the piston-head E also provided with openings $e^2$. The sleeve G has lugs $g^2$ running in the helical grooves $d^1$ (Figs. 1 and 6) of the recoil cylinder D. The grooves are laid out so that the sleeve G is turned in the direction of the arrow $x$ (Fig. 5) when the brake cylinder recoils.

The muff F has an L-shaped extension $f^1, f^2$, the arm $f^2$ of which is parallel to the axis of the piston rod and is provided with a stud $f^3$ at its free end. The stud $f^3$ engages in the groove $h^1$ of a slide H, which is placed inside of the cradle B and can travel in a guide J (Fig. 2) of the cradle, parallel with the axis of the piston rod $e^1$. The groove $h^1$ runs obliquely to the axis of the piston rod $e^1$ and in such a way that the piston rod is turned in the opposite direction to the arrow $x$ (Fig. 5) through the parts F, $f^1, f^2, f^3$, when the slide H is drawn to the rear from the position indicated in Fig. 1 to that shown in Fig. 3. At its rear end the slide H carries an arm $h^2$ (Fig. 3) in the middle of which is secured a bolt K. This bolt K reaches through a slot $b^3$ in the cradle B and travels in another slot $m^1$ of the guide M, which is attached to the outside of the cradle B. The arm $h^2$ of the slide H has such dimensions that in all positions of the slide, it covers the slot $b^3$ and thereby prevents any foreign matter from entering the cradle. The outer end of the bolt K engages with the end of a link N, which, by means of a bolt R, is pivotally connected with the bearing P, attached to the top carriage C.

With the gun in horizontal position as shown in Fig. 1, the slide H will be in its foremost position on the guide J. Similarly will the bolt K take its foremost position in its guiding slot $m^1$. The stud $f^3$, on the contrary, being part of the extension $f^1, f^2$ on the muff F, is at the rear end of the groove $h^1$ of the slide H. The piston head E, relative to the sleeve G, will have such a position that its orifices $e^2$ coincide with the openings $g^1$ of the sleeve G. The recoil-brake is consequently set for the longest recoil.

If the gun is elevated, the slide H, as well as the link N, will follow. Then the link N, will swing around the axis of the bolt R, as the top carriage C does not partake of the movement of the gun. The axis of the bolt K will then in elevating the gun travel on an arc $y$—$y$ (Fig. 1) or in the direction toward the trunnion axis. As a consequence the bolt K, during the elevation, will travel rearward in the guide slot $m^1$. The bolt K drags with it the slide H, which by means of the groove $h^1$ engaging the stud $f^3$, revolves the piston-rod $e^1$ as well as the piston rod head E in the direction opposite the arrow $x$ (Fig. 5).

With the gun in about 45° elevation the muff arm extension $f^1$ $f^2$ will take the position shown in Fig. 6. Through this, the passages $g^1$ of the sleeve G are half covered by the piston head E, so that the recoiling parts of the mount will be arrested after having traveled half the length of the longest recoil. Each elevation between 0° and 45° receives a suitable length of recoil, lying between the longest one and the one obtained with the brake in the position of Fig. 6.

The above described device for automatic adjustment of the recoil brake distinguishes itself, in particular, by its simplicity and also by its reliable working and running practically without play; and it is suitable in particular for arrangements of this kind, where the turning of the adjustable part of the brake is done by means of wheel-gearing.

It has further the advantage that any desired length of recoil can be obtained and that for a part, or parts, of the elevation, no shortening of the recoil may occur which may be arranged by, for instance the course or shape given to the groove $h^1$.

What is claimed is:—

1. A recoil mount for guns with fluid recoil brake comprising a cradle, a cylinder, relatively revoluble parts in the cylinder having fluid restricting passageways, a guideway fixed on the cradle and disposed lengthwise of the same, a member slidable within the guideway and provided with a cam-slot, one of said revoluble parts having connecting engagement with the cam-slot, and a means connecting the sliding member with a part of the gun mount not partaking of the elevation movement of the gun barrel, whereby to effect rotation of said revoluble member through the slot connection and regulate the recoil length of the gun barrel.

2. A recoil mount for guns with fluid recoil brake comprising a cradle, a cylinder, a piston and piston rod within the cylinder and secured to the cradle, a sleeve mounted on the piston rod adjacent the piston and having therein fluid restricting passageways, a guideway mounted within the cradle, a slide operable within the guideway and having a diagonally disposed slot, an arm on the piston rod having engagement with the slot, and adapted to be rotated thereby and turn the piston relatively to the sleeve, and a link connection between the slide and a part of the gun not partaking of the elevation movement of the gun barrel, said link connection being adapted to effect movement of the slide on the elevation of the gun barrel whereby to regulate the recoil length thereof.

3. A recoil mount for guns with fluid recoil brake comprising a cradle, a cylinder within the cradle, fluid throttling means within the cylinder, a guideway mounted within the cradle and disposed lengthwise of the same, a slide operable within the guideway and provided with a cam-slot having connection with the fluid throttling means, a link connection between the slide and a part of the gun mount not partaking of the elevation movement of the gun barrel whereby to effect the automatic regulation of the fluid throttling means on the elevation of the gun barrel, said link connection passing through an aperture in the cradle, and means associated with said slide adapted to maintain said aperture closed to the ingress of foreign matter at the different angles of elevation of the gun barrel.

The foregoing specification signed at Barmen, Germany, this sixth day of September, 1910.

WALTER HEILEMANN. [L. S.]

In presence of—
ALFRED HENKEL,
WALTER VONNEGUT.

---

Copies of this patent may be obtained for five cents each, by addressing the "Commissioner of Patents, Washington, D. C."